(12) United States Patent
Narayanan et al.

(10) Patent No.: US 10,380,669 B2
(45) Date of Patent: Aug. 13, 2019

(54) PRODUCT BROWSING SYSTEM AND METHOD

(71) Applicant: Wal-Mart Stores, Inc., Bentonville, AR (US)

(72) Inventors: Hemanth Kumar Narayanan, Bangalore (IN); Pravat Ranjan Rana, Bangalore (IN); Bhaavan Merchant, Bangalore (IN); Aastha Garg, Ghaziabad (IN)

(73) Assignee: WALMART APOLLO, LLC, Bentonville, AR (US)

( * ) Notice: Subject to any disclaimer, the term of this patent is extended or adjusted under 35 U.S.C. 154(b) by 917 days.

(21) Appl. No.: 14/528,668

(22) Filed: Oct. 30, 2014

(65) Prior Publication Data

US 2016/0125495 A1 May 5, 2016

(51) Int. Cl.
*G06Q 30/00* (2012.01)
*G06Q 30/06* (2012.01)
*G06F 16/248* (2019.01)
*G06F 16/951* (2019.01)

(52) U.S. Cl.
CPC ....... *G06Q 30/0623* (2013.01); *G06F 16/248* (2019.01); *G06F 16/951* (2019.01); *G06Q 30/0639* (2013.01)

(58) Field of Classification Search
CPC .......... G06Q 30/0623; G06F 17/30554; G06F 17/30864
USPC ...................................................... 705/26.61
See application file for complete search history.

(56) References Cited

U.S. PATENT DOCUMENTS

| | | | |
|---|---|---|---|
| 9,244,917 B1* | 1/2016 | Sharma | G06F 17/30905 |
| 2002/0111870 A1* | 8/2002 | Chinnappan | G06F 17/30873 |
| | | | 705/26.62 |
| 2008/0235594 A1* | 9/2008 | Bhumkar | G06F 17/30899 |
| | | | 715/738 |
| 2009/0043674 A1 | 2/2009 | Minsky | |
| 2010/0106590 A1 | 4/2010 | Fuzzell-Casey | |
| 2010/0214237 A1* | 8/2010 | Echeverri | G06F 3/04883 |
| | | | 345/173 |
| 2011/0265036 A1* | 10/2011 | Hoehne | B60K 35/00 |
| | | | 715/810 |
| 2013/0063373 A1* | 3/2013 | Roh | G06F 17/30905 |
| | | | 345/173 |
| 2013/0204419 A1* | 8/2013 | Pettersson | G06F 17/50 |
| | | | 700/97 |

(Continued)

OTHER PUBLICATIONS

Using Handhelds to Search in Physical and Digital Information Spaces (Year: 2008).*

*Primary Examiner* — Jeffrey A. Smith
*Assistant Examiner* — Lalith M Duraisamygurusamy
(74) *Attorney, Agent, or Firm* — Bryan Cave Leighton Paisner LLP (57) ABSTRACT

A query is input to a search engine and search results, such as product records, are identified as relevant to the query. The results are presented to a user in a first interface, such as one allowing scrolling in a first direction. On selection of a result, a second interface is displayed of a "shelf" for the selected result, the shelf including related items such as might be located on a same shelf as the selected result in a retail location. The second interface may allow scrolling in a second direction perpendicular to the first direction.

23 Claims, 5 Drawing Sheets

(56) References Cited

U.S. PATENT DOCUMENTS

2014/0279037 A1\* 9/2014 Zimmerman ...... G06Q 30/0256
705/14.66

\* cited by examiner

FIG. 4B ical, a query is input to a search engine and search results, such as product records, are identified as relevant to the query. The results are presented to a user in a first interface, such as one allowing scrolling in a first direction. On selection of a result, a second interface is displayed of a "shelf" for the selected result, the shelf including related items such as might be located on a same shelf as the selected result in a retail location. The second interface may allow scrolling in a second direction perpendicular to the first direction.

PRODUCT BROWSING SYSTEM AND METHOD

FIELD OF THE INVENTION

This invention relates to systems and methods for providing search results to a user.

BACKGROUND OF THE INVENTION

Online retailers constantly strive to provide relevant search results to potential customers. In a conventional approach, a user submits a query and the query is evaluated by a search engine with respect to attributes of products in a database to identify products having a high likelihood of relevance. Search engines are very sophisticated and often do provide good search results. However, invariably the user is required to sift through various pages of results in order to find a desired item.

The systems and methods described herein provide an improved approach for preventing search results to a user and guiding a user to a desired product.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In particular, a query is input to a search engine and search results, such as product records, are identified as relevant to Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as the Java® programming language, the Smalltalk programming language, the C++ programming language, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
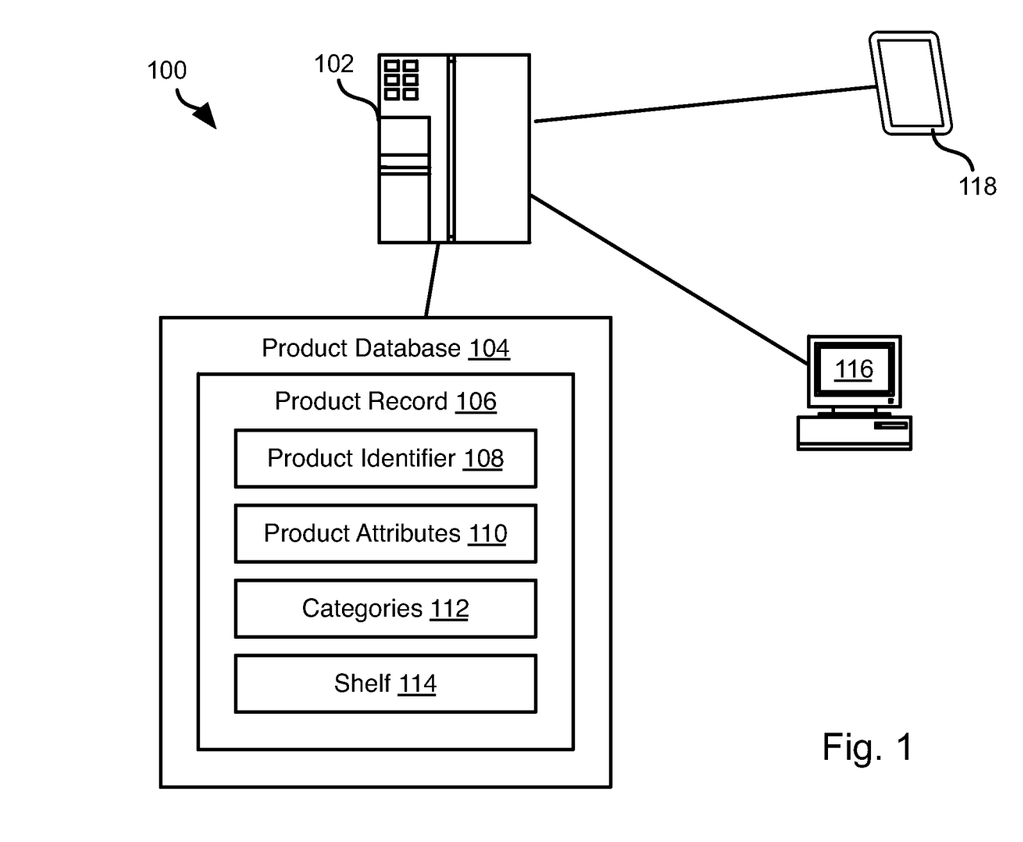
FIG. 1 is a schematic block diagram of a network environment suitable for implementing methods in accordance with embodiments of the invention.

FIG. 1 illustrates a network environment 100 in which the systems and methods disclosed herein may be implemented. For example, a server system 102 may host or access product database 104 that stores product records 106 for a plurality of products. Each product record 106 may store one or more identifiers 108 of a product represented by the product record 106 and may map a symbol or code (e.g. a universal product code UPC) to the product. The product record 108 may include a textual name of the corresponding product, e.g. a product name as printed on the product or packaging of the product.

Each product record 106 may include one or more product attributes 110. Attributes may include various <attribute> and <value> pairs, where <attribute> is a label describing the attribute and <value> is the a value for the attribute, e.g. <color>→<red>, <volume>→<24 oz.>, or the like.

Each product record 106 may include one or more categories 112 associated therewith. For example, categories 112 may be a path to the product record 106 in a hierarchical taxonomy, e.g. a path of the form <department>/<category>/<sub-category>/<sub-category>. . . , etc.

Each product record 106 may further include a "shelf" 114. In some embodiments, a shelf is defined as a set of other product records 106 that belong to the lowest sub-category (or second lowest, third lowest, or some other of sub-category) in the categories 112 of the each product record 106 (i.e. most specific or furthest from the root node of a hierarchical taxonomy). Alternatively, the shelf 114 may include product records 106 having attributes 110 that are identical to the each product record 106 but for certain attributes, such as brand, size, flavor, or some other sub set of the attributes 110 of the each product record.

The server system 102 may be accessed by user devices in data communication therewith by means of a network such as the Internet, a local area network (LAN), wide area network (WAN), or some other wired or wireless connection. User devices may include a desktop or laptop computer 116 or a mobile device 118, such as a smart phone, tablet computer, wearable computer, or some other mobile device.

Figure 2:
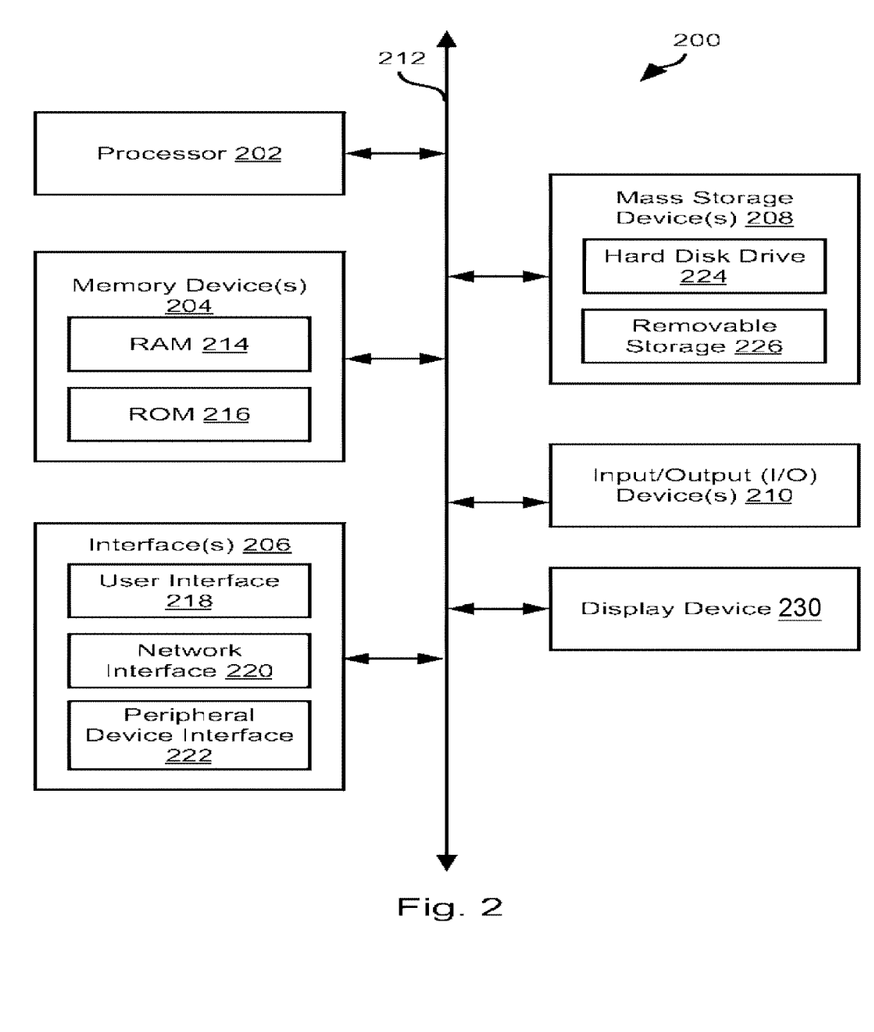
FIG. 2 is a schematic block diagram of a computer system suitable for implementing methods in accordance with embodiments of the present invention.

FIG. 2 is a block diagram illustrating an example computing device 200. Computing device 200 may be used to perform various procedures, such as those discussed herein. Computing device 200 can function as a server, a client, or any other computing entity, including any of the server system 102, computer 116, or mobile device 118. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, a display device 230, and a camera 232 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Figure 3:
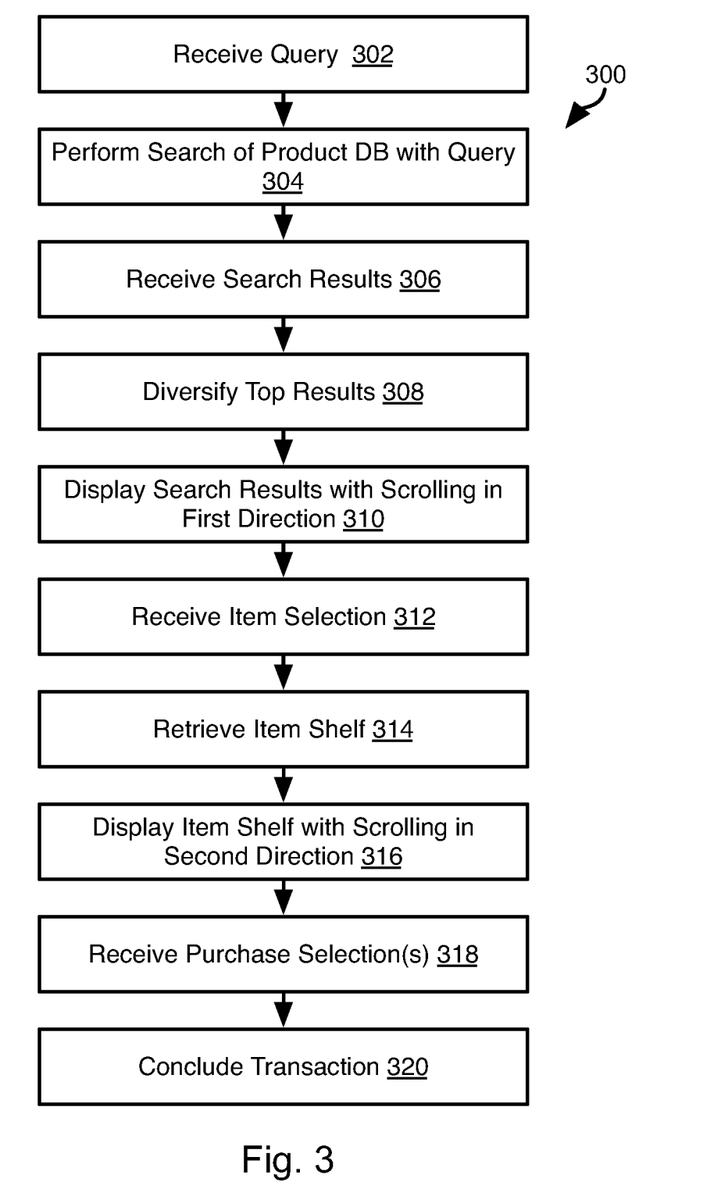
FIG. 3 is a process flow diagram of a method for providing search results in accordance with an embodiment of the present invention.

FIG. 3 illustrates a method 300 that may be executed by a computer system such as the server system 102, or a user device 116, 118, or distributed between the server system 102 and a user device 116, 118.

The method 300 may include receiving 302, by a server system 102 from the user device 116, 118, a query and performing 304 a search of a product database 104 by means of a search engine. The query may be transmitted by the user device 116, 118 to the server system 102 in response to input of the query to the user device 116, 118 with an instruction to perform a search. The search engine may be any search algorithm known in the art and may make use of the query and data contained in the product records 106 in order to identify search results. The search engine may further identify search results also using extraneous data such as data describing past behavior of users, such as click-through rates for product records displayed responsive to past queries.

The search results may be received 306 by the server system 102 and/or user device 116, 118. The search results may be product records 106, i.e. references to product records, from the product database 104 found by the search engine to be relevant to the query, or a portion of the data of the product records 106, or references to the product records 106.

In some embodiments, the search results may be further processed. For example, the search results may be returned in an order of relevance such that results at the top of the ordering have higher relevance than following search results. The results may be reordered in order to diversity 308 the search results. For example, the results may be reordered such that the top N search results in a reordered set of search results are different from the top N search results of the set of search results ordered as returned by the search engine. For example, as noted above, each product record 106 may have a shelf 114 associated therewith. Accordingly, where the top N search results in the original set from the search engine include references to product records 106 associated with M different shelves, the diversified set may include a top N search results that include references to product records 106 associated with P different shelves, P being greater than M.

For example, where one shelf is associated with Q product records 106 referenced in the top N search results, one or more of the lowest ranked of the Q product records may be replaced with one or more search results from the original set of search results other than the top N search results. For example, one or more highest ranked search results that are not in the top N search results and associated with one or more shelves that are not associated with a search result in the top N search results may replace one or more of the Q product records 106 referenced in the top N search results.

The method 300 may include displaying 310 the search results, as reordered at step 308 or as originally returned by the search engine, on a user device, such as the user device 116, 118 from which the query 302 was received. Displaying 310 the search results may include transmitting an interface definition to the user device, i.e. computer instructions and data sufficient to instruct the user device to render an interface for displaying and interacting with the search results on the user device. For example, the interface may be a web page such as an HTML (hypertext markup language) document or some other document. Alternatively, the interface may include content formatted for rendering in an application of a merchant executing on the user device. The interface may define methods and data for displaying a portion of the search results and receiving and executing instructions to scroll through the inputs and receive and process selections of search results. The interface may define a scrolling direction in a first direction with respect to a display device. For example, the first direction may be the vertical direction.

The method 300 may further include receiving 312 in the interface a selection of a search result presented in the interface. In response to receiving the selection, the method 300 may include retrieving 314 the shelf 114 for the product record referenced by the selected search result. In particular, the product records referenced in the shelf 114 for the product record may be retrieved 314, i.e. some or all of the data contained in these product records such as the identifier and additional information such as an image and price.

The items of the shelf may be transmitted to the user device for display, i.e. as instructions for rendering a second interface including representations of the product records of the shelf and including interface elements for receiving and executing instructions to scroll through the representations of the product records of the shelf. The second interface may further include instructions for receiving and processing selection of a representation in the second interface. In some embodiments, the second interface defines a scrolling direction that is perpendicular to the first direction, e.g. in the horizontal direction. The second interface may then be displayed 316 on the user device and any scrolling or selecting instructions received. As illustrated in FIG. 4B, the second interface may be superimposed on the first interface.

The method 300 may further include receiving 318 selection of one or more items for purchase on the user device in either of the first or second interfaces and concluding 320 a transaction for the one or more items selected for purchase. Interaction between the user device and server system 102 in order to transmit the selections from the user device to the server system 102 and process payment therefore may be performed according to any method for conducting ecommerce transactions known in the art.

Figure 4A:
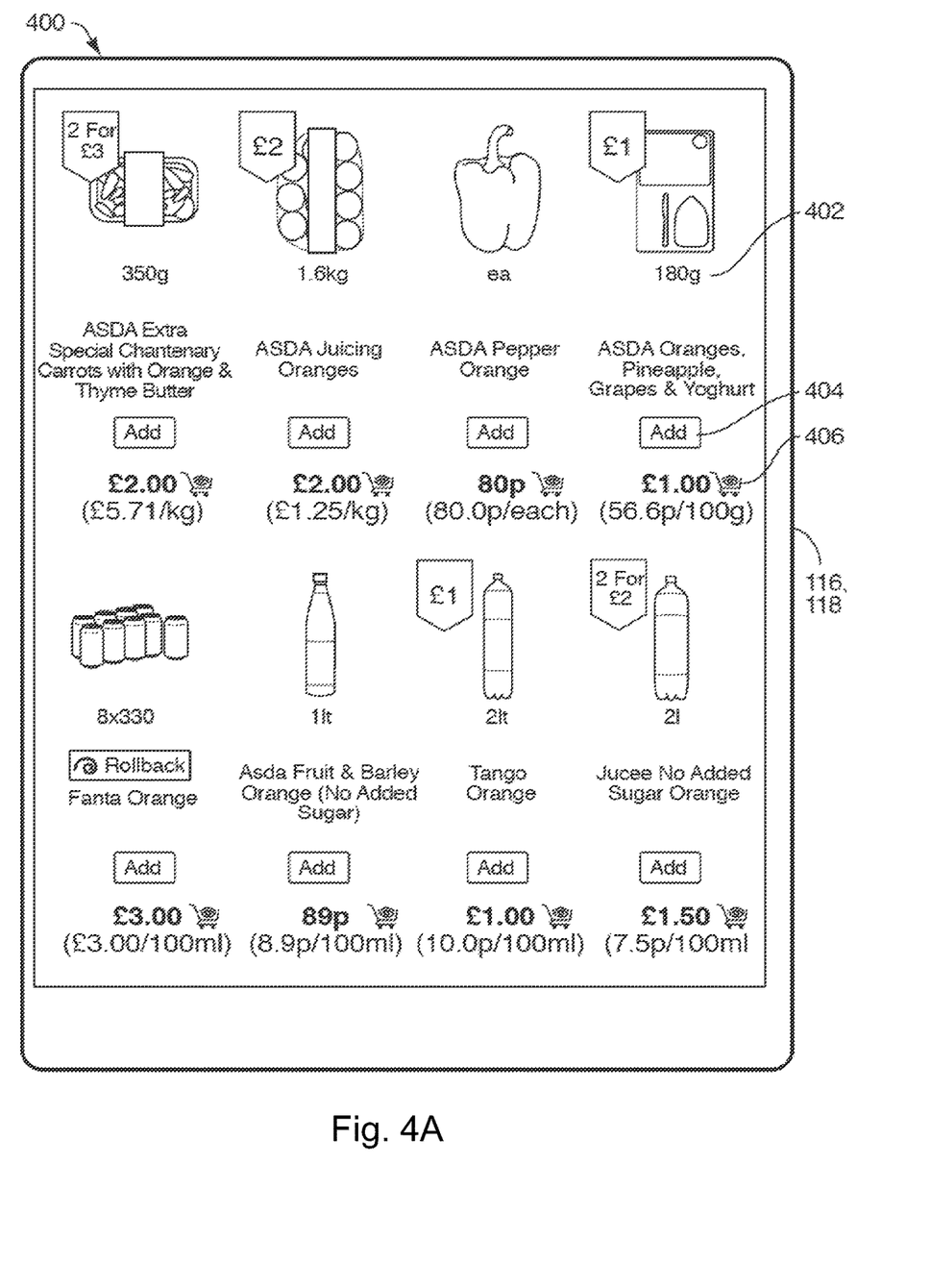
FIGS. 4A and 4B are example interfaces for providing search results in accordance with an embodiment of the present invention.
Figure 4B:
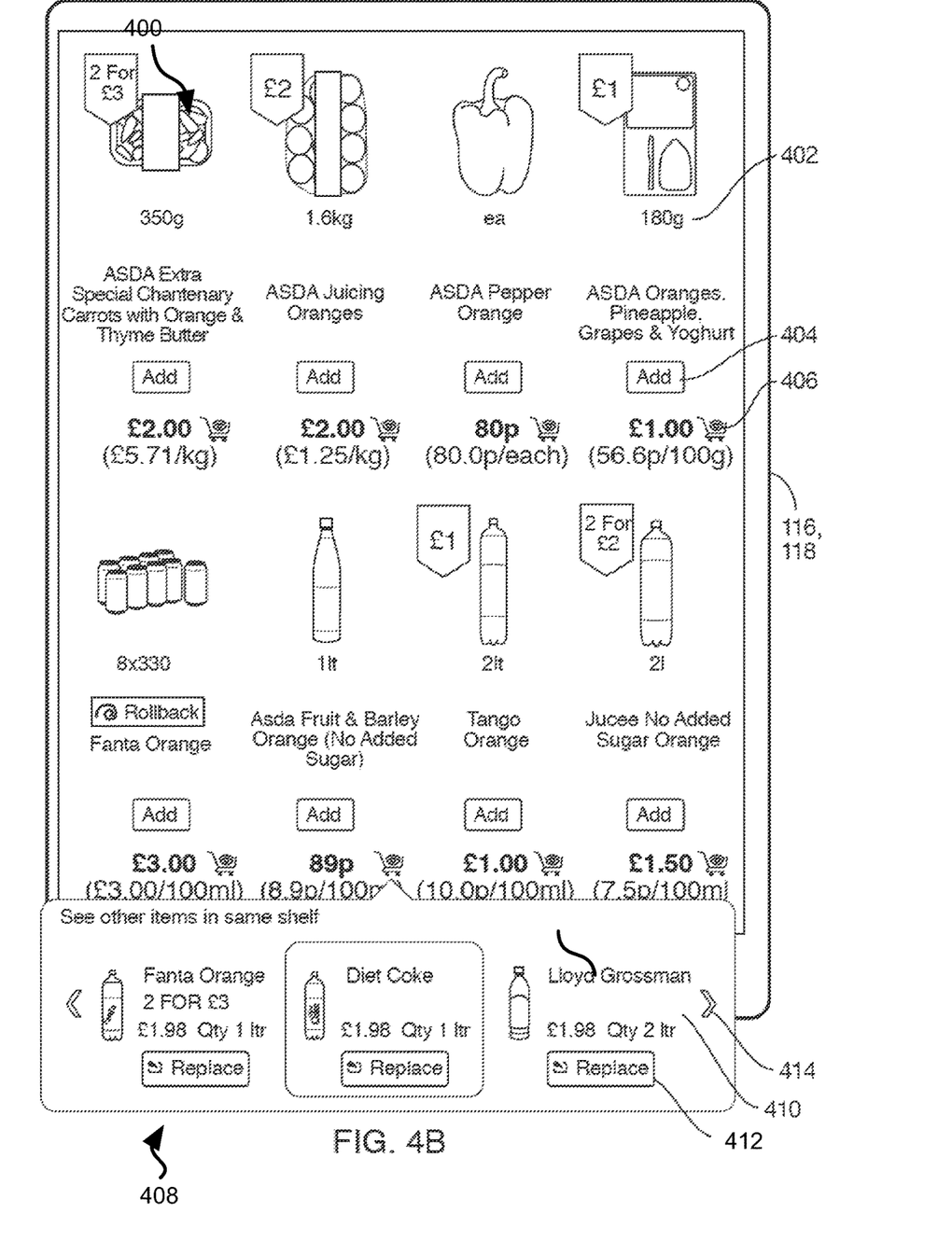

FIG. 4A illustrates an example of the first interface 400 as described above. As shown a plurality of representations 402 of product records are displayed on a user device 116, 118. The representations may include data from the product records 106 of the search results, such as an identifier, image, price, description, discounts, or some other data. The interface may further include adjacent or on each representation one or more interface elements 404 for invoking actions with respect to the product records corresponding to the representation. For example, the "add" button imposed on a representation of a product record may invoke on the user device 116, 118 adding of the product record to an electronic shopping cart. Scrolling of the representations 406 in the first direction may be accomplished by swiping of a touch screen, interacting with interface elements invoking scrolling, receiving a keystroke instructing scrolling, or some other manner.

In some embodiments, interface element 406 may invoke display of a shelf 114 of a corresponding product record 106 of a representation 402 as described with respect to steps 312-316 above.

For example, referring to FIG. 4B, in response to selection of element 406, a second interface 408 may be displayed as shown with representations 410 of product records of the shelf 114 of the product record 106 corresponding to the selected element 406. Interface element 412 may be included on the representations 410 of product records of the shelf 114. The interface may invoke replacement of element 406 with the selected representation 410 in response to interaction with element 412. An interface element 412 similar to element 404 may be included in each representation 410 to invoke adding of the product corresponding to the each representation 410 to an electronic shopping cart for subsequent purchase as described above. Interface elements 414 may invoke scrolling of the representations 410 in the second direction. As is apparent, the second interface 408 is superimposed on the first interface 400. Alternatively, scrolling of the representations 410 in the second direction may be performed by the device 116, 118 in response to swiping of a touch screen, receiving of a keystroke, or some other input.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
receiving, by a computer system via a computer network interface, a query from a mobile handheld user device;
submitting, by the computer system via the computer network interface, the query to a search engine configured to search a product database with respect to the query and identify relevant product records;
receiving, by the computer system via the computer network interface, search results from the search engine, the search results including a plurality of result identifiers corresponding to the relevant product records;
transmitting, by the computer system to the mobile handheld user device via the computer network interface, first instructions for displaying a first interface on a display device of the mobile handheld user device, the first interface comprising the search results;
receiving, by the computer system from the mobile handheld user device via the computer network interface, a first notification of interaction with a first interface element of a first selected result of the search results displayed on the first interface displayed on the display device of the mobile handheld user device;
in response to receiving the first notification of interaction with the first selected result, transmitting, by the computer system to the mobile handheld user device via the computer network interface, second instructions for superimposing a second interface over a portion of the first interface displayed on the display device of the mobile handheld user device, the second interface comprising representations of second product records in a shelf of a product record corresponding to the first selected result, wherein the shelf corresponds to a first physical shelf in a physical retail store offering for sale a first product corresponding to the first selected result, and wherein the first physical shelf in the physical retail store contains second products corresponding to the second product records;
receiving, by the computer system from the mobile handheld user device via the computer network interface, a second notification of interaction with a second interface element of a second selected result of the representations of the second product records in the shelf of the product record corresponding to the first selected result; and
in response to receiving the second notification of interaction with the second selected result, transmitting, by the computer system to the mobile handheld user device via the computer network interface, third instructions for replacing the first selected result with the second selected result on the first interface displayed on the mobile handheld user device.

2. The method of claim 1, further comprising:
receiving, by the mobile handheld user device via an input device, a first scrolling input in the first interface; and
in response to receiving the first scrolling input, transmitting instructions to scroll, on the mobile handheld user device, a display of the search results on the mobile handheld user device in a first direction, the instructions to scroll being sent from the computer system to the mobile handheld device via the computer network interface.

3. The method of claim 2 further comprising:
receiving, by the mobile handheld user device via the input device, a second scrolling input in the second interface; and
in response to receiving the second scrolling input, transmitting second instructions to scroll, on the mobile handheld user device, a display of the representations of the second product records in the shelf of the product record corresponding to the first selected result in a second direction, the second instructions to scroll being sent from the computer system to the mobile handheld device via the computer network interface.

4. The method of claim 3, wherein the first direction is perpendicular to the second direction.

5. The method of claim 3, wherein the first direction is a vertical direction and the second direction is a horizontal direction.

6. The method of claim 1, wherein the second product records related to the first selected result comprise one or more brands that are alternative brands to a brand associated with the product record corresponding to the first selected result.

7. The method of claim 1, wherein the second product records related to the first selected result comprise one or more sizes that are alternative sizes to a size associated with the product record corresponding to the first selected result.

8. The method of claim 1, wherein:
the method further comprises:
receiving, by the mobile handheld user device via an input device, a first scrolling input in the first interface;
in response to receiving the first scrolling input, transmitting instructions to scroll, on the mobile handheld user device, a display of the search results on the user device in a first direction, the instructions to scroll sent from the computer system to the mobile handheld device via the computer network interface;
receiving, by the mobile handheld user device via the input device, a second scrolling input in the second interface; and
in response to receiving the second scrolling input, transmitting second instructions to scroll, on the mobile handheld user device, a display of the representations of the second product records in the shelf of the product record corresponding to the first selected result in a second direction, the second instructions to scroll sent from the computer system to the mobile handheld device via the computer network interface;
the first direction is perpendicular to the second direction;
the first direction is a vertical direction and the second direction is a horizontal direction; and
the second product records related to the first selected result comprise at least one of:
one or more brands that are alternative brands to a brand associated with the product record corresponding to the first selected result; or
one or more sizes that are alternative sizes to a size associated with the product record corresponding to the first selected result.

9. A system comprising:
one or more processors; and
one or more memory devices storing computer instructions configured to run on the one or more processors and to perform acts of:
receiving a query from a mobile handheld user device via a computer network interface;
submitting, via the computer network interface, the query to a search engine configured to search a product database with respect to the query and identify relevant product records;
receiving search results from the search engine via the computer network interface, the search results including a plurality of result identifiers;
transmitting, to the mobile handheld user device via the computer network interface, first instructions for displaying a first interface on a display device of the mobile handheld user device, the first interface comprising the search results;
receiving, from the mobile handheld user device via the computer network interface, a first notification of interaction with a first interface element of a first selected result of the search results displayed on the first interface displayed on the mobile handheld user device;
in response to receiving the first notification of interaction with the first selected result, transmitting, to the mobile handheld user device via the computer network interface, second instructions for superimposing a second interface over a portion of the first interface displayed on the display device of the mobile handheld user device, the second interface comprising representations of second product records in a shelf of a product record corresponding to the first selected result, wherein the shelf corresponds to a first physical shelf in a physical retail store offering for sale a first product corresponding to the first selected result, and wherein the first physical shelf in the physical retail store contains second products corresponding to the second product records;
receiving, from the mobile handheld user device via the computer network interface, a second notification of interaction with a second interface element of a second selected result of the representations of the second product records in the shelf of the product record corresponding to the first selected result, the second interface element configured to invoke a replacement of the first selected result with the second selected result on the first interface displayed on the mobile handheld user device; and
in response to receiving the second notification of interaction with the second selected result, transmitting, to the mobile handheld user device via the computer network interface, third instructions for replacing the first selected result with the second selected result on the first interface displayed on the mobile handheld user device.

10. The system of claim 9, wherein the one or more memory storage devices storing the computer instructions are further configured to run on the one or more processors and to perform acts of:
receiving, by the mobile handheld user device via an input device, a first scrolling input in the first interface; and
in response to receiving the first scrolling input, transmitting instructions to scroll, on the mobile handheld user device, a display of the search results on the mobile handheld user device in a first direction, the instructions to scroll being sent to the mobile handheld device via the computer network interface.

11. The system of claim 10, wherein the one or more memory storage devices storing the computer instructions are further configured to run on the one or more processors and to perform acts of:
receiving, by the mobile handheld user device via the input device, a second scrolling input in the second interface; and
in response to receiving the second scrolling input, transmitting second instructions to scroll, on the mobile handheld user device, a display of the representations of the second product records in the shelf of the product record corresponding to the first selected result in a second direction, the second instructions to scroll being sent to the mobile handheld device via the computer network interface.

12. The system of claim 11, wherein the first direction is perpendicular to the second direction.

13. The system of claim 12, wherein the first direction is a vertical direction and the second direction is a horizontal direction.

14. The system of claim 9, wherein the second product records related to the first selected result comprise one or more brands that are alternative brands to a brand associated with the product record corresponding to the first selected result.

15. The system of claim 9, wherein the second product records related to the first selected result comprise one or more sizes that are alternative sizes to a size associated with the product record corresponding to the first selected result.

16. The system of claim 9, wherein:
the one or more memory storage devices storing the computer instructions are further configured to run on the one or more processors and to perform acts of:
receiving, by the mobile handheld user device via an input device, a first scrolling input in the first interface;
in response to receiving the first scrolling input, scrolling, by the mobile handheld user device, a display of the search results on the mobile handheld user device in a first direction, the display of the search results being displayed on the display device of the mobile handheld user device;
receiving, by the mobile handheld user device, a second scrolling input in the second interface; and
in response to receiving the second scrolling input, transmitting instructions to scroll, on the mobile handheld user device, a display of the representations of the second product records in the shelf of the product record corresponding to the first selected result in a second direction, the instructions to scroll being sent to the mobile handheld device via the computer network interface;
the first direction is perpendicular to the second direction;
the first direction is a vertical direction and the second direction is a horizontal direction; and
the second product records related to the first selected result comprise at least one of:
one or more brands that are alternative brands to a brand associated with the product record corresponding to the first selected result; or
one or more sizes that are alternative sizes to a size associated with the product record corresponding to the first selected result.

17. A method comprising:
receiving, by a mobile handheld user device via an input device, a query;
transmitting, by the mobile handheld user device via a computer network interface, the query to a computer system;
receiving, by the mobile handheld user device via the computer network interface, search results for the query and first instructions for displaying a first interface on a display device of the mobile handheld user device, the first interface comprising the search results;
displaying, by the mobile handheld user device on the display device of the mobile handheld user device, the first interface comprising the search results;
receiving, by the mobile handheld user device via the computer network interface, a first interaction with a first interface element of a first selected result of the search results displayed on the first interface displayed on the display device of the mobile handheld user device;
transmitting, by the mobile handheld user device via the computer network interface, a first notification of the first interaction with the first selected result to the computer system;
receiving, by the mobile handheld user device via the computer network interface, instructions for superimposing a second interface over a portion of the first interface displayed on the display device of the mobile handheld user device, the second interface comprising representations of second product records in a shelf of the product record corresponding to the first selected result, wherein the shelf corresponds to a first physical shelf in a physical retail store offering for sale a first product corresponding to the first selected result, and wherein the first physical shelf in the physical retail store contains second products corresponding to the second product records;
displaying, by the mobile handheld user device on the display device of the mobile handheld user device, the second interface comprising the representations of the second product records-in the shelf of a product record corresponding to the first selected result;
receiving, by the mobile handheld user device via the computer network interface, a second interaction with a second interface element of a second selected result of the representations of the second product records in the shelf of the product record corresponding to the first selected result, the second interface element configured to invoke a replacement of the first selected result with the second selected result on the first interface displayed on the mobile handheld user device; and
displaying, by the mobile handheld user device on the display device of the mobile handheld user device, the first interface comprising the search results with the second selected result replacing the first selected result.

18. The method of claim 17 further comprising:
receiving, by the mobile handheld user device via the input device, a first scrolling input in the first interface; and
in response to receiving the first scrolling input, scrolling, by the mobile handheld user device, a display of the search results on the mobile handheld user device in a first direction, the display of the search results being displayed on the display device of the mobile handheld user device.

19. The method of claim 18 further comprising:
receiving, by the mobile handheld user device via the input device, a second scrolling input in the second interface; and
in response to receiving the second scrolling input, scrolling, by the mobile handheld user device, a second display of the representations of the second product records in the shelf of the product record corresponding to the first selected result in a second direction, the second display of the representations of the second product records being displayed on the display device of the mobile handheld user device.

20. The method of claim 19, wherein the first direction is a vertical direction and the second direction is a horizontal direction.

21. The method of claim 17, wherein the second product records related to the first selected result comprise one or more brands that are alternative brands to a brand associated with the product record corresponding to the first selected result.

22. The method of claim 17, wherein the second product records related to the first search result comprise one or more sizes that are alternative sizes to a size associated with the product record corresponding to the first selected result.

23. The method of claim 17, wherein:

the method further comprises:
- receiving, by the mobile handheld user device via the input device, a first scrolling input in the first interface;
- in response to receiving the first scrolling input, scrolling, by the mobile handheld user device, a display of the search results on the mobile handheld userdevice in a first direction, the display of the search results being displayed on the display device of the mobile handheld user device;
- receiving, by the mobile handheld user device via the input device, a second scrolling input in the second interface; and
- in response to receiving the second scrolling input, scrolling, by the mobile handheld user device, a second display of the representations of the second product records in the shelf of the product record corresponding to the first selected result in a second direction, the second display of the representations of the second product records being displayed on the display device of the mobile handheld user device;

the first direction is a vertical direction and the second direction is a horizontal direction; and the second product records related to the first search result comprise at least one of:
- one or more brands that are alternative brands to a brand associated with the product record corresponding to the first selected result; or
- one or more sizes that are alternative sizes to a size associated with the product record corresponding to the first selected result.

* * * * *